(12) United States Patent
Amma et al.

(10) Patent No.: US 9,124,141 B2
(45) Date of Patent: Sep. 1, 2015

(54) WIRELESS POWER TRANSMISSION SYSTEM

(75) Inventors: Kenichi Amma, Tokyo (JP); Katuhito Yamamoto, Tokyo (JP); Yoshiharu Fuse, Tokyo (JP); Tomohisa Kimura, Tokyo (JP); Mamoru Osawa, Aichi (JP); Hidenori Takasugi, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 917 days.

(21) Appl. No.: 13/379,772

(22) PCT Filed: Jun. 25, 2010

(86) PCT No.: PCT/JP2010/060835
§ 371 (c)(1),
(2), (4) Date: Feb. 10, 2012

(87) PCT Pub. No.: WO2010/150872
PCT Pub. Date: Dec. 29, 2010

(65) Prior Publication Data
US 2012/0126631 A1  May 24, 2012

(30) Foreign Application Priority Data
Jun. 26, 2009  (JP) ................. 2009-151898

(51) Int. Cl.
*B60L 1/00* (2006.01)
*H02J 17/00* (2006.01)
(Continued)

(52) U.S. Cl.
CPC ............... *H02J 17/00* (2013.01); *B60L 3/0069* (2013.01); *B60L 11/182* (2013.01); *H02J 5/00* (2013.01);
(Continued)

(58) Field of Classification Search
CPC ........... H02J 17/00; H02J 5/005; H02J 7/025; H02J 3/01; H01F 38/14; B60L 11/182; B60L 11/1829; B60L 11/1931; Y02T 90/122
See application file for complete search history.

(56) References Cited

U.S. PATENT DOCUMENTS 5,117,066 A  5/1992  Balsells
5,545,842 A  8/1996  Balsells
(Continued)

FOREIGN PATENT DOCUMENTS

JP  4-334098  11/1992
JP  7-22254  1/1995
(Continued)

OTHER PUBLICATIONS

Japanese Decision to Grant a Patent mailed Jun. 19, 2013 in corresponding Japanese Patent Application No. 2009-151898 with partial English translation.
(Continued)

*Primary Examiner* — Daniel Cavallari
(74) *Attorney, Agent, or Firm* — Wenderoth, Lind & Ponack, L.L.P.

(57) ABSTRACT

It is desired to provide a wireless power transmission system which it is possible to more surely prevent the leakage of a microwave. A wireless power transmission system includes: a power transmission antenna configured to output a microwave from an output plane; a power reception antenna arranged in a position opposing to said output plane of said power transmission antenna in power transmission and configured to receive the microwave outputted from said power transmission antenna by an input plane; and a shield section configured to electromagnetically shield a space between said power transmission antenna and said power reception antenna from an external space by a plurality of outer circumference coil springs provided in an area which surrounds said output plane of said power transmission antenna. The coil spring bends along a convex section compared with a wire member when there is the convex section in a hit part. Therefore, good electromagnetic wave shield efficiency is obtained.

9 Claims, 8 Drawing Sheets

(51) Int. Cl.
  H02J 5/00     (2006.01)
  B60L 3/00     (2006.01)
  B60L 11/18    (2006.01)

(52) U.S. Cl.
  CPC ........ *B60L 2230/14* (2013.01); *B60L 2270/147* (2013.01); *Y02T 10/7005* (2013.01); *Y02T 10/7088* (2013.01); *Y02T 90/122* (2013.01); *Y02T 90/14* (2013.01)

(56) References Cited

U.S. PATENT DOCUMENTS

| | | | |
|---|---|---|---|
| 5,599,027 A | | 2/1997 | Balsells |
| 5,850,135 A | * | 12/1998 | Kuki et al. ............ 320/108 |
| 6,967,462 B1 | * | 11/2005 | Landis ............ 320/101 |
| 2010/0065352 A1 | | 3/2010 | Ichikawa |

FOREIGN PATENT DOCUMENTS

| | | |
|---|---|---|
| JP | 7-174115 | 7/1995 |
| JP | 2008-054422 | 3/2008 |
| JP | 2008-54424 | 3/2008 |
| JP | 2009-303316 | 12/2009 |
| JP | 2010-98807 | 4/2010 |

OTHER PUBLICATIONS

Chinese Decision to Grant a Patent issued Apr. 25, 2014 in corresponding Chinese Patent Application No. 201080028368.9 with English translation.
International Search Report issued Sep. 21, 2010 in International (PCT) Application No. PCT/JP2010/060835.
Hino Motors, Ltd., "Hi Sesshoku Kyuden Sochi", Japan Institute of Invention and Innovation, Journal of Technical Disclosure, 2009-506456, Japan Institute of Invention and Innovation (JIII), Nov. 9, 2009.

* cited by examiner

WIRELESS POWER TRANSMISSION SYSTEM

TECHNICAL FIELD

The present invention is related to a wireless power transmission. Especially, the present invention is related to a technique for transmitting power in wireless in a relatively near distance.

BACKGROUND ART

A technique for charging an electric apparatus by wireless power transmission is developing. In the technique, a microwave is outputted from a power transmission unit and is received by a power reception unit which converts into an electric energy in order to charge the apparatus on the side of the power reception unit.

When carrying out wireless charging with the microwave, the charging efficiency drops if a part of the microwave leaks without reaching the power reception unit. A technique is described in Patent Literature 1 (JP 2008-54424A) which can solve the above problem. In this technique, an electromagnetic wave shield section is used. The electromagnetic wave shield section surrounds a space between a power transmission antenna and a power reception antenna in an operation condition in which a microwave is received, and is accommodated in a main body in a non-operation condition.

CITATION LIST

[Patent Literature 1]: JP 2008-54424A

SUMMARY OF THE INVENTION

In Patent Literature 1 (JP 2008-54424A), it is described that "it becomes possible to make a tip of a conductive member flexible" by using "a brush—like conductive member formed by bundling many wire-like or stick-like conductors" as the electromagnetic wave shield member. In relation to this, the inventor of the present invention studied the electromagnetic wave shield member using a brush of the wire-like or stick-like conductors.

Figure 1A:
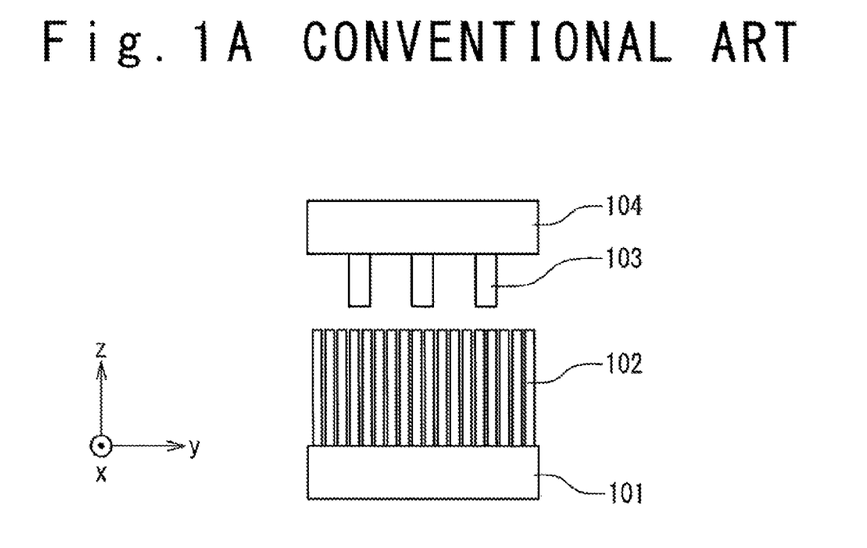
FIG. 1A is a partial side view of a conventional example of a wireless power transmission system.
Figure 1B:
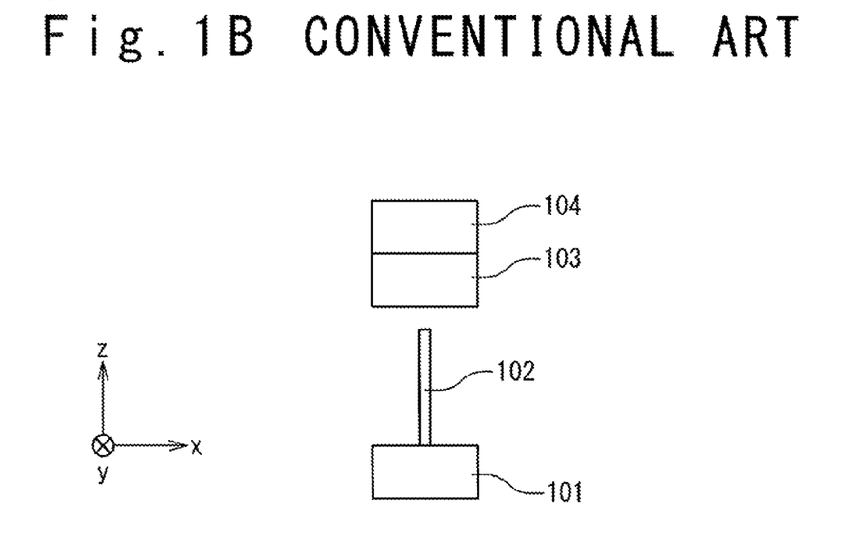
FIG. 1B is a partial side view of the conventional example of the wireless power transmission system when viewed from another direction.

FIG. 1A is a partial side view showing a conventional example of a wireless power transmission system provided with a brush which functions as the electromagnetic wave shield member. FIG. 1A shows a power transmitting section 101 and a power receiving section 104 which are separated by a great distance so that wireless power transmission is not carried out. FIG. 1B is a partial side view of the wireless power transmission system when viewed from another direction. The power transmitting section 101 is embedded and fixed in the ground at an energy station. The brush 102 of many wire-like conductors is attached to the power transmitting section 101. On the other hand, the power receiving section 104 is provided for the bottom of an electric vehicle which uses this energy station. The reception plane of the power receiving section 104 opposite to the power transmitting section 101 is always not flat, and sometimes has a convex section 103 such as a fin for heat radiation.

Figure 2A:
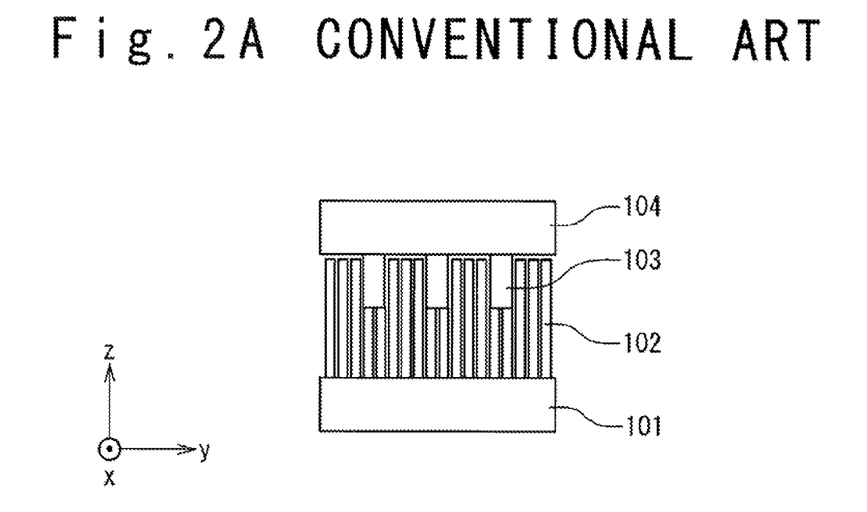
FIG. 2A is a partial side view of the conventional example of the wireless power transmission system.
Figure 2B:
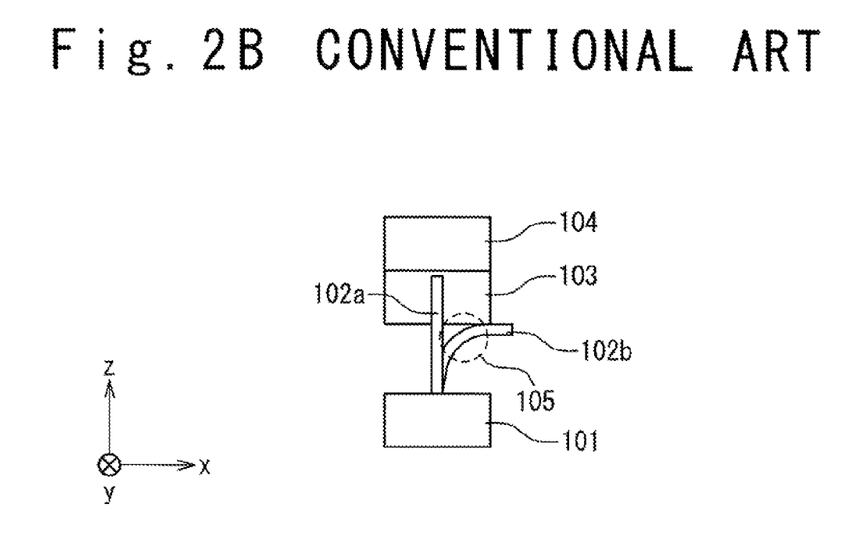
FIG. 2B is a partial side view of the conventional example of the wireless power transmission system when viewed from another direction.

FIG. 2A is a partial side view showing a state when the power receiving section 104 is arranged near the power transmitting section 101 for charging. FIG. 2B is a partial side view of the wireless power transmission system when viewed from another direction. The tip of brush 102 is positioned in approximately the same height as the reception plane of the power receiving section 104. In this state, a part of the brush 102 hits the convex section 103. FIG. 2B shows a part 102b of the brush 102 which hits the convex section 103 and a part 102a of the brush 102 which does not hit the convex section 103. The brush part 102b bends by hitting the convex section 103.

The inventor of the present invention paid attention to a possibility that an opening is generated in a bending region 105 of the brush part 102b as shown in FIG. 2B. When there is such an opening, the microwave leaks out and the charging efficiency sometimes drops.

Therefore, one subject matter of the present invention is to provide a wireless power transmission system which the leakage of microwave can be prevented more surely.

In an aspect of the present invention, the wireless power transmission system includes: a power transmission antenna configured to output a microwave from an output plane; a power reception antenna arranged in a position opposite to the output plane of the power transmission antenna in power transmission and configured to receive the microwave outputted from the power transmission antenna by an input plane; and a shield section configured to electromagnetically shield a space between the power transmission antenna and the power reception antenna from an external space by a plurality of outer circumference coil springs provided in an area surrounding the output plane of the power transmission antenna.

In another side of the present invention, the length of each of the plurality of outer circumference coil springs is longer than a distance between the power transmission antenna and the power reception antenna in the power transmission.

In another side of the present invention, a pitch between corresponding portions of each of the plurality of outer circumference coil springs is equal to or less than $1/50$ of the wavelength of the microwave.

In another side of the present invention, each of the plurality of outer circumference coil springs extends from the power transmission antenna toward the power reception antenna while inclining toward a direction of an external space of the space. In another side of the present invention, the wireless power transmission system further includes a plurality of inner circumference coil springs connected at one ends in an inner area than the plurality of outer circumference coil springs to surround the output plane of the power transmission antenna.

In another side of the present invention, the plurality of outer circumference coil springs extend toward the power reception antenna from the power transmission antenna while inclining toward the external direction from the space.

In another side of the present invention, the plurality of inner circumference coil springs extend toward the power reception antenna from the power transmission antenna while inclining toward an inner direction from the space.

In another aspect of the present invention, the wireless power transmission system includes a power transmission antenna configured to output a microwave from an output plane; and a shield section configured to electromagnetically shields from an external space, an inner space between the power transmission antenna and a power reception antenna which is arranged in a position opposite to the output plane of the power transmission antenna in power transmission and which receives the microwave outputted from the power transmission antenna by an input plane, by a plurality of outer circumference coil springs in an area surrounding the output plane of the power transmission antenna at one ends.

In another aspect of the present invention, the wireless power transmission system includes a power reception antenna arranged in a position opposite to an output plane of a power transmission antenna which outputs a microwave from the output plane in power transmission, to receive the microwave outputted from the power transmission antenna by an input plane; and a shield section configured to electromagnetically shields from an external space, an inner space between the power transmission antenna and the power reception antenna by a plurality of outer circumference coil springs attached to an area surrounding the input plane of the power reception antenna at one ends.

According to the present invention, the wireless power transmission system is provided which the leakage of microwave can be prevented more surely.

BRIEF DESCRIPTION OF THE DRAWINGS

The above object, other objects, effect and features of the present invention become clearer from the description of embodiments in cooperation with the following drawings.

DESCRIPTION OF EMBODIMENTS

Hereinafter, a wireless power transmission system of the present invention will be described with reference to the attached drawings.

First Embodiment

Figure 3:
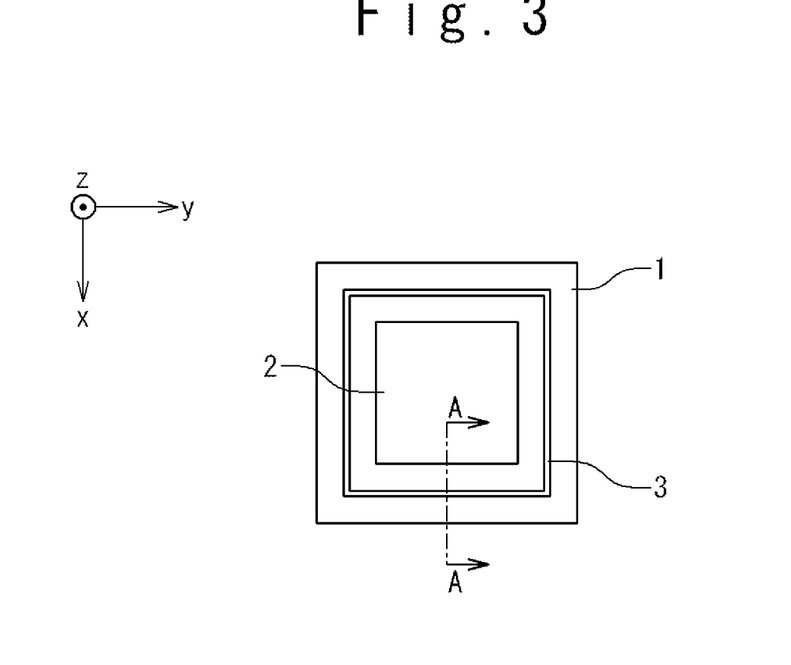
FIG. 3 is a top view of a power transmitting section.

FIG. 3 is a top view of a power transmitting section 1 in the wireless power transmission system according to a first embodiment of the present invention when being viewed from a direction opposite to the Z direction. In FIG. 3, the power transmitting section 1 has a plane shape of a square but may have another shape such as a circular shape. A power transmission antenna 2 has a predetermined shape and is arranged on the surface of the power transmitting section 1. The power transmission antenna 2 is formed as an output plane which outputs microwave power. Coil springs 3 are attached on the surface of the power transmitting section 1 to surround the power transmission antenna 2 for shielding electromagnetic wave.

Figure 4:
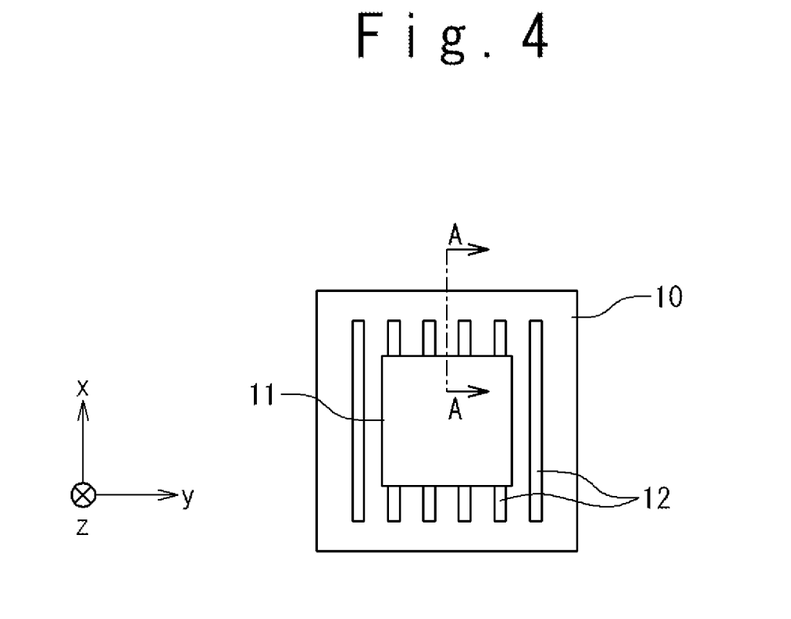
FIG. 4 is a bottom view of a power receiving section.

FIG. 4 is a bottom view of a power receiving section 10 in the wireless power transmission system when viewed from the Z direction. In FIG. 4, the power receiving section 10 has a plane shape of a square but may have another shape. A power reception antenna 11 having a predetermined shape is arranged on the underside of the power receiving section 10. The power reception antenna 11 is arranged in a position opposite to the power transmission antenna 2 and is an input plane which receives the microwave outputted from the power transmission antenna 2. The power reception antenna 11 is formed in an area which contains the power transmission antenna 2, viewing in the Z direction when it is arranged in the position opposite to the power transmission antenna 2. It is desirable that the power reception antenna 11 is formed to have an area wider than that of the power transmission antenna 2 because the microwave is correctly received without loss even if the position of the power transmission antenna 2 is displaced. The power receiving section 10 converts the microwave received by the power reception antenna 11 into electric power, and charges a battery which is used as a power supply for a drive motor in an electric vehicle. The power reception antenna 11 has protrusion sections 12 such as fins used to radiate heat which is generated in the wireless power transmission.

In the present embodiment, the power transmitting section 1 is arranged in the ground at an energy station so that the power transmission antenna 2 turns upwardly. The power receiving section 10 is attached to the bottom surface of the electric vehicle so that the power reception antenna 11 turns downward at the energy station. By using such a wireless power transmission system, the electric vehicle stops at a fixed position in the energy station and is charged. Because the wireless power transmission is used, the operation such as connection of a plug to the electric vehicle in the energy station is unnecessary.

Figure 5A:
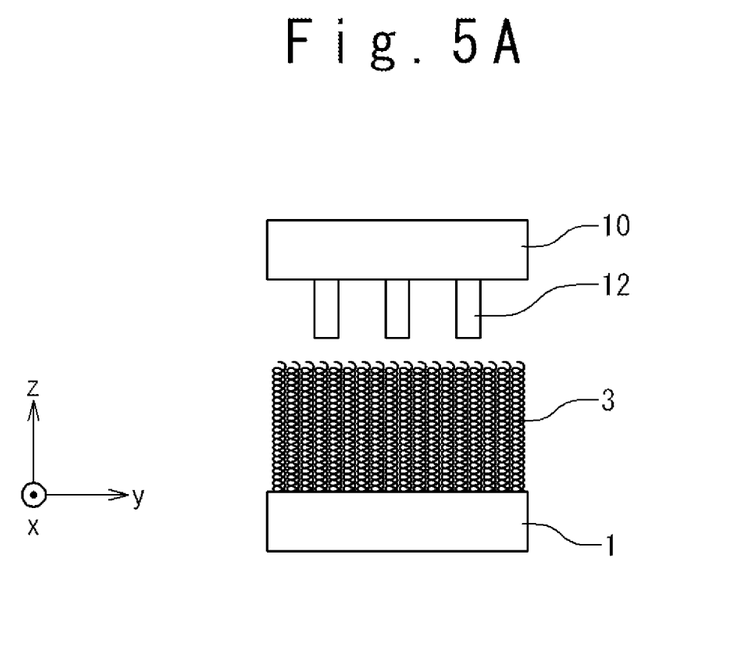
FIG. 5A is a partial side view of the wireless power transmission system.
Figure 5B:
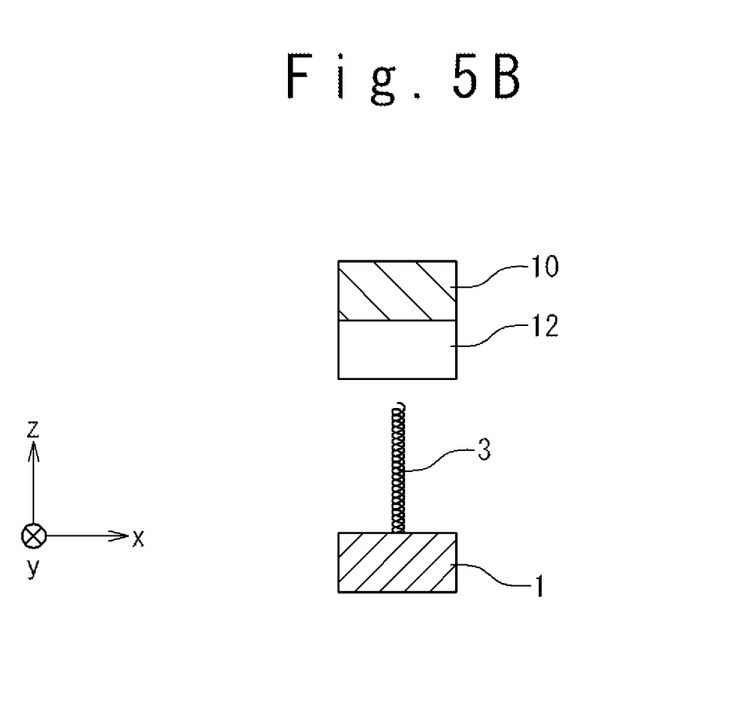
FIG. 5B is a sectional view of the wireless power transmission system along the line A-A in FIG. 3 and FIG. 4.

FIG. 5A are a partial side view showing the wireless power transmission system which is composed of the power transmitting section 1 shown in FIG. 3 and the power receiving section 10 shown in FIG. 4, when viewed from a direction opposite to the X direction. FIG. 5B is a partial sectional view showing the wireless power transmission system along the line A-A in FIG. 3 and FIG. 4. FIG. 5A and FIG. 5B show a case where the power transmitting section 1 and the power receiving section 10 are apart from each other so that the wireless power transmission system is not on the wireless power transmission.

An electromagnetic wave shield member of the power transmitting section 1 includes many coil springs 3. The coil spring 3 is formed of a material which has the electromagnetic wave shield effect. The material is typically metal, and especially, phosphor bronze as a suitable material. Each coil spring 3 is fixedly arranged in an area at one end to surround the power transmission antenna of the power transmitting section 1 and is arranged in the posture that the coil spring 3 extends upwardly from the surface of the power transmitting section 1. In the present embodiment, the coil springs 3 have a same length. The other ends of the many coil springs 3 are located substantially in a plane. As shown in FIG. 5A, the neighbor coil springs 3 are arranged closely to each other to form a sheet shield plane by the many coil springs 3. A space between the power transmission antenna 2 and the power reception antenna 11 is electromagnetically shielded from an external space by the shield plane.

Figure 6A:
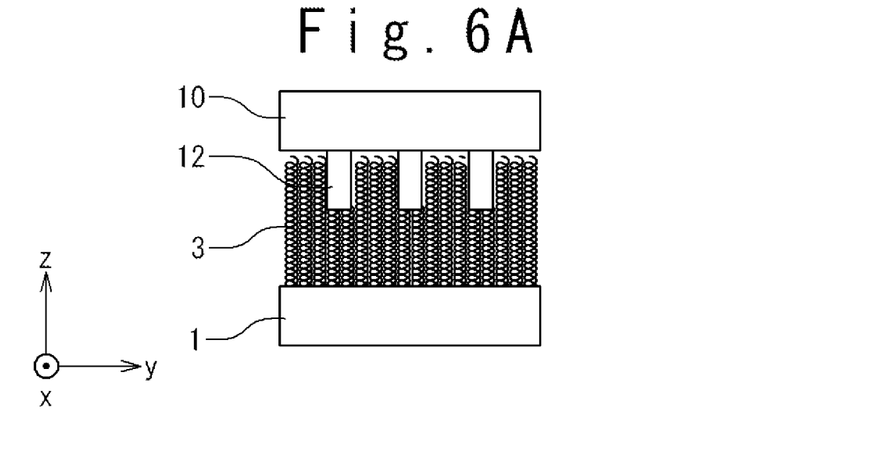
FIG. 6A is a partial side view of the wireless power transmission system.
Figure 6B:
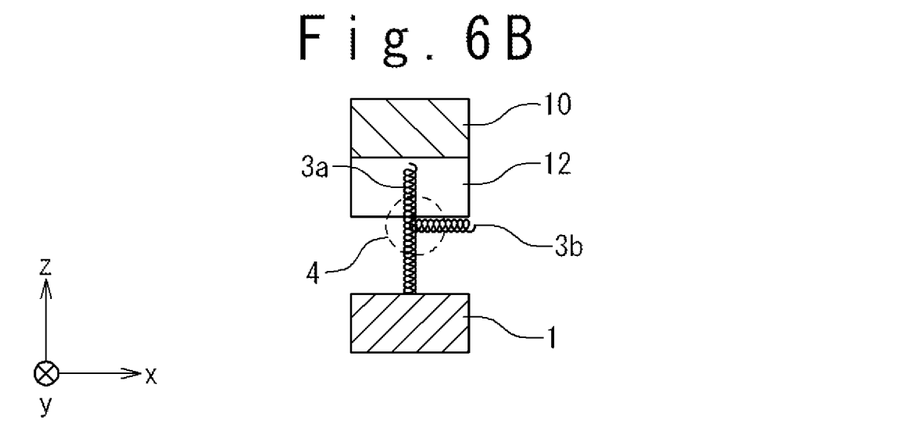
FIG. 6B is a sectional view of the wireless power transmission system along the line A-A in FIG. 3 and FIG. 4.

FIG. 6A is a partial side view showing the power receiving section 10 which is arranged near the power transmitting section 1 for the wireless power transmission. FIG. 6B is a partial sectional view showing the wireless power transmission system along the line A-A in FIG. 3 and FIG. 4. To shield the microwave enough, the coil spring 3 has a length which is longer than a distance between the power transmission antenna 2 and the power reception antenna 11 in power transmission. In the present embodiment, the power reception antenna 11 of the power receiving section 10 is arranged on the almost same plane formed by the upper ends of the coil springs 3 of the power transmitting section 1 in the height. In this condition, the coil spring 3a maintains an upwardly extending posture in the area of the power receiving section 10 where the protrusion section 12 does not exist, to form the sheet shield planes.

Figure 6C:
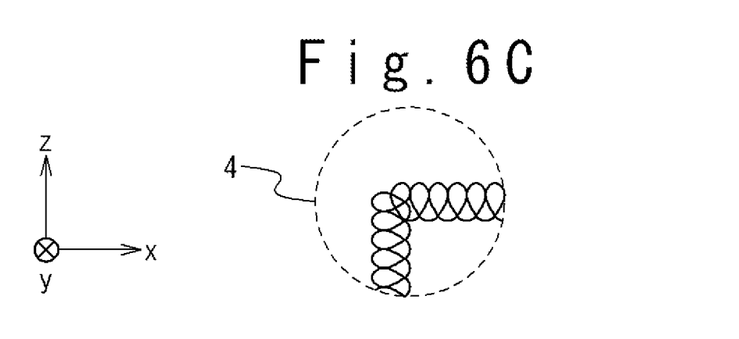
FIG. 6C is a partial expanded view of a contact region 4 in FIG. 6B.

In the condition shown in FIG. 6A and FIG. 6B, the coil springs 3b contact the protrusion section 12 and bent in a contact region 4, in the area of the power receiving section 10 where the protrusion section 12 exists. FIG. 6C is a partial expanded view of the contact region 4. In the contact region 4, the coil springs 3b are transformed to extend along the surface of the protrusion section 12 rather than the brush is bent as shown in FIG. 1B. In an example shown in FIG. 6B and FIG. 6C, the coil springs 3b hit against the surface of the protrusion section 12, which is orthogonal to the length direction of the coil springs 3b, and bend to a right-angle direction in the contact region 4. Therefore, a distance between the protrusion section 12 and the sheet shield plane can be made small, compared with the bending region 105 shown in FIG. 2B, so that the better electromagnetic wave shield performance is obtained.

When there is the protrusion section in the contact region, the coil spring bends to the direction along the protrusion section in a shorter distance than a simple wire member. Here, the word "bend" means that the coil spring transforms in a range of elastic deformation as if the coil spring is bent as the shape of the whole coil spring.

The reason why the coil spring has such excellent shape following capability will be described below. Comparing the wire member and the coil spring which have the same length in a longitudinal direction, the coil spring is longer in the length along the wire than the wire member. In other words, the coil spring contains the wire which is longer than the wire member for every unit length in the longitudinal direction. Therefore, comparing the wire member and the coil spring which are formed of the same wire, the coil spring can show larger bend into a direction orthogonal to the longitudinal direction for every unit length in the longitudinal direction. By such a characteristic, the electromagnetic wave shield member formed from the coil springs 3 has the excellent shape following capability to the unevenness of the power receiving section 10, as shown in FIG. 6B and FIG. 6C.

Because the coil spring 3 has excellent shape following capability, the leakage of the microwave due to the unevenness of the bottom surface can be suppressed, even when the electric vehicle stops to displace a little bit from a specified position in the energy station, and the high charging efficiency can be achieved.

In order to achieve the high shield effect, the neighbor coil springs 3 are desirably arranged in a distance equal to or less than $\frac{1}{10}$ of the wavelength of the microwave (typically 2.45 GHz), more desirably, in a distance equal to or less than $\frac{1}{50}$ of the wavelength. Also, a pitch in the coil spring 3, that is, a pitch between wire portions having a same angle in the circular cylinder coordinate around the central axis of the coil spring 3 is desirably equal to or less than $\frac{1}{10}$ of the wavelength of the microwave, and more desirably equal to or less than $\frac{1}{50}$. In the coil spring used by the inventor, the wire diameter is 0.3 mm and the diameter of the whole coil spring is 0.8 mm. Thus, the shape follow capability could be achieved which is more excellent than the brush of wire-like or stick-like member.

Second Embodiment

Figure 7:
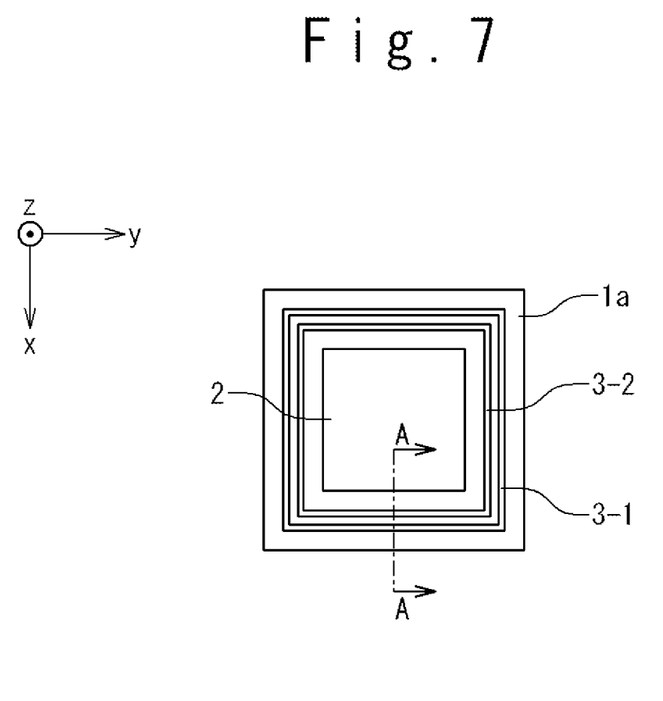
FIG. 7 is a top view of the power transmitting section.

FIG. 7 is a top view showing the power transmitting section 1a of the wireless power transmission system in a second embodiment. In the wireless power transmission system of the present embodiment, the power receiving section 10 has the same configuration as the first embodiment. The power transmitting section 1a of the present embodiment includes inner circumference coil springs 3-2 formed in an area surrounding the area where the power transmission antenna 2 is formed, and outer circumference coil springs 3-1 formed in an area separating from the inner circumference coil springs 3-2 by a distance of a given width.

Figure 8A:
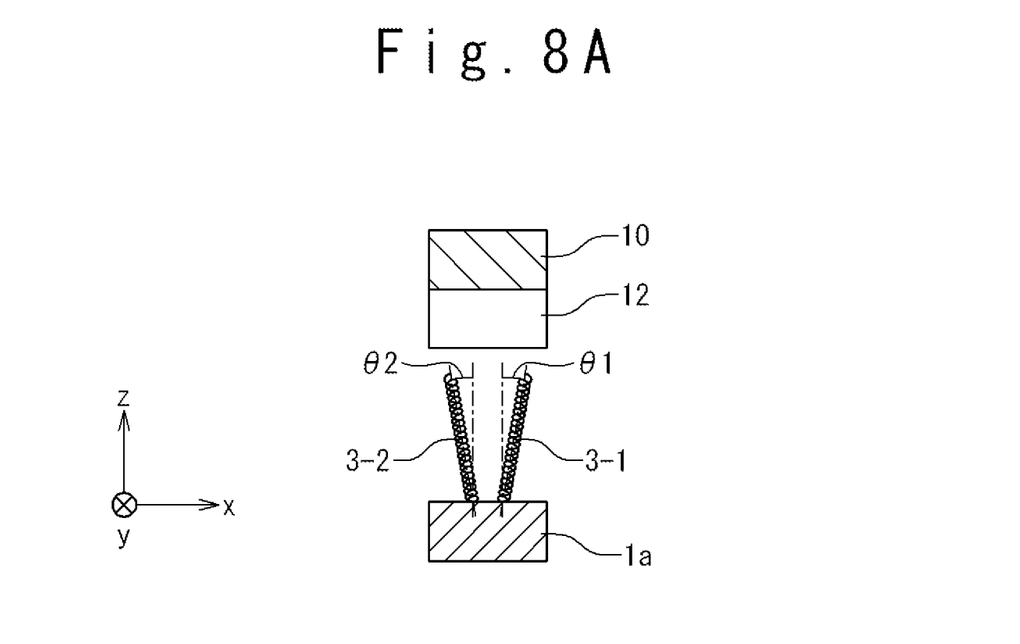
FIG. 8A is a sectional view of the wireless power transmission system along the line A-A in FIG. 7.

FIG. 8A is a partial sectional view showing the wireless power transmission system of the power transmitting section 1a and the power receiving section 10, along the line A-A in FIG. 7. The outer circumference coil springs 3-1 are provided for the power transmitting section 1a such that the central axis of the coil spring 3-1 inclines toward the outer direction while extending from the power transmission antenna 2 toward the power reception antenna 11 (i.e. from the root of each coil spring 3-1 toward the tip). The angle θ1 between a line perpendicular to the surface of the power transmission antenna 2 and the central axis of the coil spring is about 10 degrees and is desirably from 5 degrees to 15 degrees. The inner circumference coil springs 3-2 are provided for the power transmitting section 1a such that the central axis of the coil spring inclines toward the inner direction while extending from the power transmission antenna 2 toward the power reception antenna 11. The angle θ2 between the line perpendicular to the surface of the power transmission antenna 2 and the central axis of the coil spring 3-2 is about 10 degrees and is desirably from 5 degrees to 15 degrees.

Figure 8B:
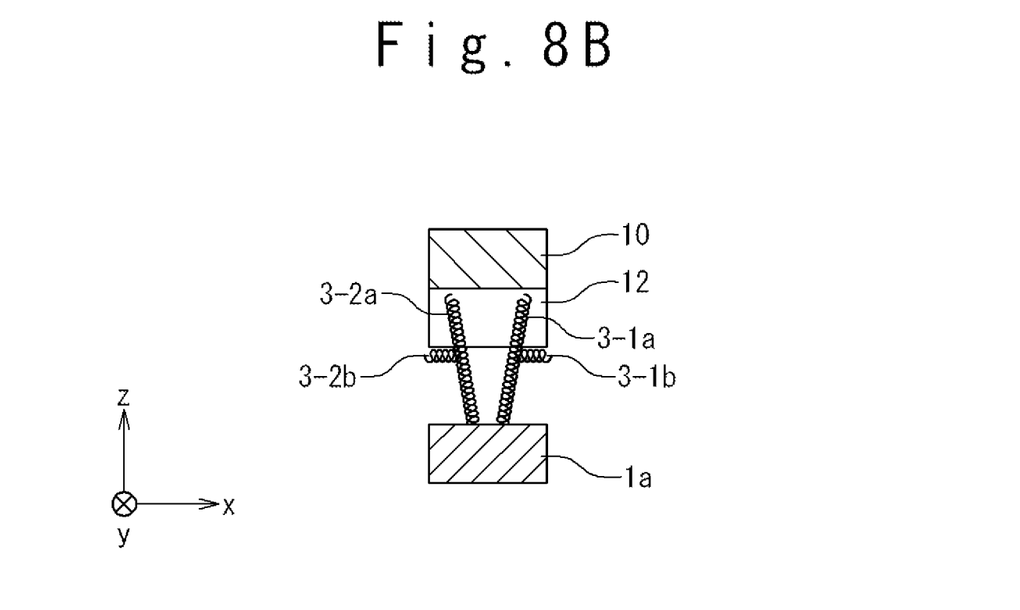
FIG. 8B is a sectional view of the wireless power transmission system along the line A-A in FIG. 7.

FIG. 8A is a partial side view showing the wireless power transmission system when the power receiving section 10 is arranged near the power transmitting section 1a for wireless power transmission. FIG. 8B is a particle sectional view showing the wireless power transmission system along the line A-A in FIG. 7. The power reception antenna 11 in the power receiving section 10 is arranged on almost the same height as that of a plane of the upper ends of the coil springs 3 of the power transmitting section 1a. In this state, the outer circumference coil springs 3-1a and the inner circumference coil springs 3-2a which are located in the area where the protrusion section 12 of the power receiving section 10 does not exist, keep straightly extending posture to form the sheet shield plane.

The outer circumference coil springs 3-1b which are located in the area where the protrusion section 12 exists bend to the side of the outer circumference from the power transmitting section 1a, or to the side opposite to the power transmission antenna 2, due to the angle θ1. The outer circumference coil springs 3-1b are possible to bend uniformly to the side of the outer circumference with small force due to the angle θ1. The inner circumference coil springs 3-2b which are located in the area where the protrusion section 12 exists bend to the side of the inner circumference of the power transmitting section 1a, i.e. the side of the power transmission antenna 2, due to the angle θ2. The inner circumference coil springs 3-2b can bend uniformly to the side of the inner circumference with small force due to the angle θ2. Because the outer circumference coil springs 3-1b and the inner circumference coil springs 3-2b bend to opposite directions to each other, they never hinder transformation.

By the above configuration, the sheet shield planes of the high shield effect are formed by the outer circumference coil springs 3-1 and the inner circumference coil spring 3-2. Even if a part of the microwave generated by the power transmitting section 1a is leaked from the shield plane formed by the inner circumference coil spring 3-2, the wireless power transmission with little leakage of the microwave can be realized because the leakage is shielded by the outer circumference coil springs 3-1. In order to attain such double shield effect, it is desirable to arrange the outer circumference coil springs 3-1 and the inner circumference coil springs 3-2 to be separated by a given distance without neighboring them to each other. Of course, the number of lines of the coil springs may be equal to or more than three lines.

Even if the shield plane of the coil springs arranged to be inclined on the side of the outer circumference like the outer circumference coil springs 3-1 of the present embodiment is applied to the shield plane of the coil springs 3 of one line in the first embodiment, a good electromagnetic wave shield effect is attained.

Third Embodiment

Figure 9:
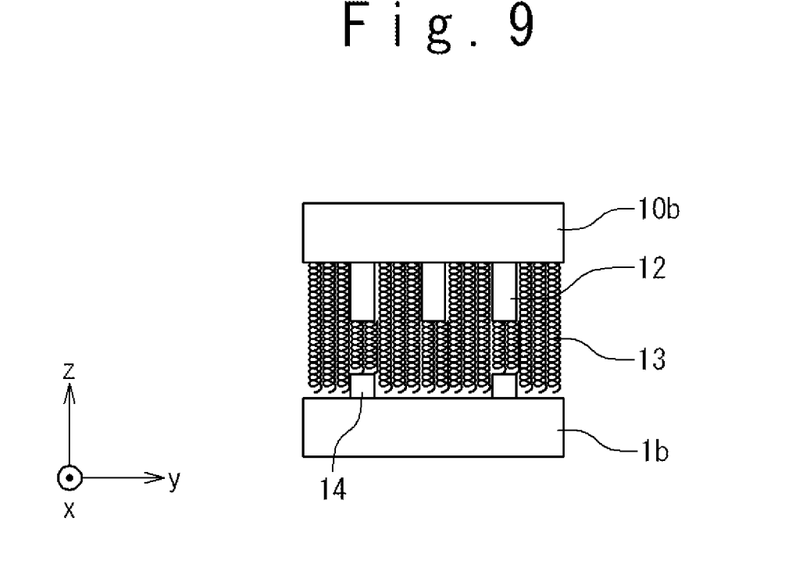
FIG. 9 is a partial side view of the wireless power transmission system.
Figure 10:
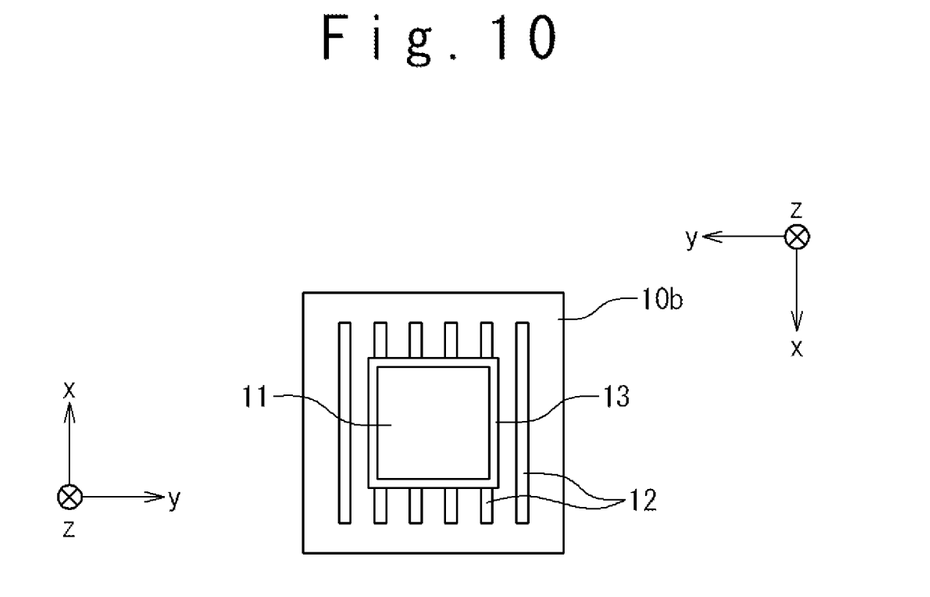
FIG. 10 is a bottom view of the reception section.

FIG. 9 is a partial side view showing the wireless power transmission system according to a third embodiment when viewed from X direction. In the present embodiment, the coil springs 13 for shielding the electromagnetic wave are provided for the power receiving section 10b. FIG. 10 is a bottom view of the power receiving section 10b. The power receiving section 10b has the power reception antenna 11. Many coil springs 13 are arranged to surround the power reception antenna 11. Each of the coil springs 13 is fixed at one ends to surround the power reception antenna 11 of the power receiving section 10b and are arranged in the posture to straightly extend from the underside of the power receiving section 10b.

According to such a configuration, when a protrusion section 14 exists on the side of the power transmitting section 1b, the coil springs 13 in the area corresponding to the protrusion section 14 bend in the shape along the protrusion section 14. As a result, good electromagnetic wave shield effect can be attained. By arranging the coil springs 13 in the present embodiment in the same way as the outer circumference coil springs 3-1 showed in FIG. 8A and FIG. 8B, the desired effect can be attained. In this case, each coil spring 13 is arranged to the side of the outer circumference, i.e. diagonally in the direction depart from the power reception antenna 11 toward the tip from the root. In the present embodiment, it is effective to arrange the coil springs of a plurality of lines in the power receiving section 10b, like the second embodiment.

In the above embodiments, the power transmitting section is fixed in the ground so as for the power transmission antenna to turn upwardly and the power receiving section is arranged to turn downwardly. However, the effect of the present invention can be attained even if these positions are exchanged. Also, in each embodiment, the case has been described where one of both of the power transmitting section and the power receiving section have the protrusion section. However, when an optional unevenness structure exists in the neighborhood of the power transmitting section and the power receiving section or when the distance between the power transmitting section and the power receiving section has a distribution, the good electromagnetic wave shield effect can be attained by using the coil springs in the same way.

Although the present invention has been described with reference to the above embodiments, the present invention is not limited to the above embodiments. Various modifications can be carried out to the above embodiments.

It should be noted that this patent application claims a priority on convention based on Japanese Patent Application No. JP 2009-151898 filed on Jun. 26, 2009 and the disclosure thereof is incorporated herein by reference.

The invention claimed is:

1. A wireless power transmission system comprising:
a power transmission antenna configured to output a microwave from an output plane;
a power reception antenna arranged in a position opposing to said output plane of said power transmission antenna in power transmission and configured to receive the microwave outputted from said power transmission antenna by an input plane; and
a shield section configured to electromagnetically shield a space between said power transmission antenna and said power reception antenna from an external space by a plurality of outer circumference coil springs provided in an area which surrounds said output plane of said power transmission antenna.

2. The wireless power transmission system according to claim 1, wherein a length of each of said plurality of outer circumference coil springs is longer than a distance between said power transmission antenna and said power reception antenna in the power transmission.

3. The wireless power transmission system according to claim 1, wherein a pitch between corresponding portions of each of said plurality of outer circumference coil springs is equal to or less than $\frac{1}{50}$ of a wavelength of said microwave.

4. The wireless power transmission system according to claim 1, wherein said plurality of outer circumference coil springs extend toward said power reception antenna from said power transmission antenna while inclining toward an external direction from said space.

5. The wireless power transmission system according to claim 1, further comprising:
a plurality of inner circumference coil springs connected at one ends in an inner area than said plurality of outer circumference coil springs to surround said output plane of said power transmission antenna.

6. The wireless power transmission system according to claim 5, wherein said plurality of outer circumference coil springs extend toward said power reception antenna from said power transmission antenna while inclining toward the external direction from said space.

7. The wireless power transmission system according to claim 6, wherein said plurality of inner circumference coil springs extend toward said power reception antenna from said power transmission antenna while inclining toward an inner direction from said space.

8. A wireless power transmission system comprising:
a power transmission antenna configured to output a microwave from an output plane; and
a shield section configured to electromagnetically shield from an external space, an inner space between said power transmission antenna and a power reception antenna which is arranged in a position opposing to said output plane of said power transmission antenna in power transmission and which receives the microwave outputted from said power transmission antenna by an input plane, by said plurality of outer circumference coil springs in the area surrounding said output plane of said power transmission antenna at one ends.

9. A wireless power transmission system comprising:
a power reception antenna arranged in a position opposing to an output plane of a power transmission antenna which outputs a microwave from said output plane in power transmission, to receive the microwave outputted from said power transmission antenna by an input plane; and
a shield section configured to electromagnetically shields from an external space, an inner space between said power transmission antenna and said power reception antenna by a plurality of outer circumference coil springs attached to an area surrounding said input plane of said power reception antenna at one ends.

* * * * *